US 6,633,531 B1

(12) United States Patent
Hirono et al.

(10) Patent No.: US 6,633,531 B1
(45) Date of Patent: Oct. 14, 2003

(54) OPTICAL DISK DRIVE

(75) Inventors: Mastoshi Hirono, Chiba-ken (JP);
Masayuki Sekimura, Tokyo (JP);
Makoto Asakura, Tokyo (JP); Yoriyuki Ishibashi, Kanagawa-ken (JP); Takao Ohmi, Kanagawa-ken (JP); Yasuo Motegi, Kanagawa-ken (JP); Minoru Yonezawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 192 days.

(21) Appl. No.: 09/635,682

(22) Filed: Aug. 10, 2000

(30) Foreign Application Priority Data

Aug. 10, 1999  (JP) ............................. 11-226776

(51) Int. Cl.$^7$ ................................. G11B 7/00
(52) U.S. Cl. .................. 369/112.23; 369/199
(58) Field of Search .................. 369/94, 44.23, 369/112.27, 112.28, 112.29, 112.25, 112.26, 112.23, 112.24, 195, 199; 359/368, 385, 324

(56) References Cited

U.S. PATENT DOCUMENTS 5,373,499 A * 12/1994 Imaino et al. ............... 369/94
5,497,359 A    3/1996 Mamin et al.
5,761,111 A * 6/1998 Glezer ....................... 359/368
5,930,033 A * 7/1999 Inoue et al. ................ 359/368

OTHER PUBLICATIONS

M. Harada, Nikkei Electronics No. 718, Jun. 15, 1998, pp. 45–50.

M. Harada, Nikkei Electronics Nol. 713, Apr. 6, 1998, pp. 27–28.

E. Hecht and A. Zajac, Addison–Wesley, Reading, Mass., 1974, p. 83).

* cited by examiner

Primary Examiner—Thang V. Tran
(74) Attorney, Agent, or Firm—Pillsbury Winthrop LLP (57) ABSTRACT

An optical disk drive having an optical disk that permits transmission of a laser beam, an optical disk holding mechanism configured to rotatably support the optical disk, a first laser beam irradiation mechanism disposed on one side of the optical disk, causing the first laser beam to be vertically incident on one surface of the optical disk, and a first evanescent optical system disposed on the other side of the optical disk. The first evanescent optical system is configured to receive the first laser beam which emanates from the laser beam irradiation mechanism and passes through the optical disk, and radiate the first evanescent wave to the other surface of the optical disk having at least one recording surface.

14 Claims, 7 Drawing Sheets

OPTICAL DISK DRIVE

BACKGROUND OF THE INVENTION

1. Field of the Invention

This invention relates to an optical disk drive. More particularly, this invention relates to an optical disk drive for recording and reproducing information by the use of evanescent light.

2. Description of the Related Art

Innovative development and improvement have been made from various aspects in technologies for achieving a high recording density in the information recording field.

One of the high density recording technologies that has been proposed is a method that uses a lens capable of generating evanescent waves. This lens is referred to as a "solid immersion lens". In a solid immersion lens, rays of light undergo total internal reflection and generate an evanescent wave. The evanescent wave generated by the solid immersion lens forms a very fine optical spot. Therefore, the solid immersion lens makes it possible to improve the information recording density on a recording medium such as an optical disk.

Figure 11:
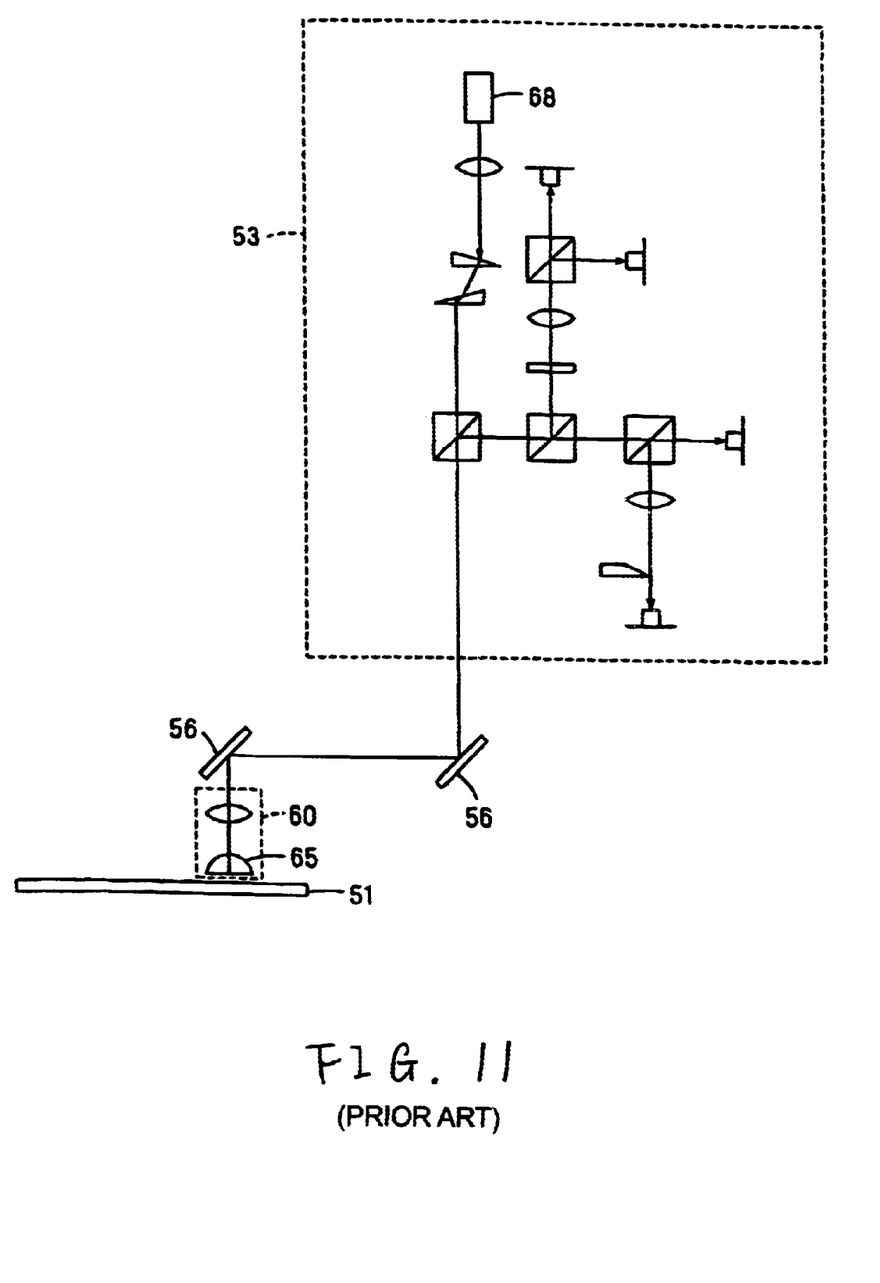
FIG. 11 is a schematic view showing an optical system of an optical disk drive according to the prior art.

As illustrated in FIG. 11 of the accompanying drawings, an optical disc drive using the solid immersion lens comprises a fixed optical system 53 including a laser beam source 68, rise-up mirrors 56 for causing parallel rays of light to be incident vertically on a disk 51, and an evanescent optical system 60 for causing the parallel rays of light incident from above to generate evanescent waves and irradiating a very fine optical spot at a lower portion. Recording and reproduction of information to and from the disk 51 is executed by means of the very fine optical spot irradiated from the evanescent optical system 60.

Here, the term "rise-up mirror 56" represents all those optical components which are equipped with a plane for reflecting the rays of light, and is inclusive of a beam splitter. The evanescent optical system 60 is an optical element containing the solid immersion lens 65 described above.

The need to reduce the thickness of various devices related to personal computers has become greater in recent years as personal computers have been rendered "mobile".

In the construction depicted in FIG. 11, however, both evanescent optical system 60 and rise-up mirror 56 are disposed on the disk plane side for recording or reproducing the information. In other words, a space corresponding to the height of at least these two optical elements is necessary on one of the surface sides of the disk.

When an optical disk drive can record or reproduce information on at least two disk surfaces on the basis of the construction shown in FIG. 11, the space corresponding to the height of the two optical elements must be secured on each disk surface with the result that the total thickness of the optical disk drive increases.

In view of the problem described above, the present invention is directed to provide an optical disk drive that can restrict the increase of the thickness of the apparatus particularly when the information is recorded or reproduced on at least two disk surfaces.

SUMMARY OF THE INVENTION

To accomplish the object described above, the present invention provides an optical disk drive as described below.

In a first aspect of the invention, an optical disk drive comprises an optical disk which permits transmission of a laser beam, an optical disk holding mechanism configured to rotatably support the optical disk, a first laser beam irradiation mechanism disposed on one side of the optical disk, configured to cause the first laser beam to be incident vertically on one surface of the optical disk, and a first evanescent optical system disposed on the other side of the optical disk, configured to receive a first laser beam which emanates from the laser beam irradiation mechanism and passes through the optical disk, and configured to radiate the first evanescent wave to the other surface of the optical disk having at least one recording surface.

Embodiments of this aspect of the present invention may have any of the following features:

(1) A track pitch of a signal train recorded to the optical disk may be smaller than the wavelength of the first laser beam.

(2) The first laser beam irradiation mechanism may have a first mirror disposed at a position opposing the first evanescent optical system.

(3) The first mirror may be a 45° mirror.

(4) The first mirror may be a prism.

(5) The first evanescent optical system may include a first solid immersion lens.

(6) The first solid immersion lens may include a bottom surface to which the first laser beam is incident and which radiates the first evanescent wave, and a reflecting surface which reflects the first laser beam incident from the lens bottom surface and converges the first laser beam to the lens bottom surface.

(7) The distance between the lens bottom surface of the first solid immersion leans and the surface of the optical disk opposing the lens bottom surface may be within the attenuation distance of the evanescent wave.

(8) The optical disk drive may further comprise a second laser beam irradiation mechanism disposed adjacent to the first evanescent optical system, configured to cause the second laser beam to be vertically incident to the other surface of the optical disk, and a second evanescent optical system disposed adjacent to the first laser beam irradiation mechanism, configured to receive the second laser beam incident from the second laser beam irradiation mechanism, passing through the optical disk, and configured to radiate the second evanescent wave to one surface of the optical disk.

(9) The optical disk holding mechanism may hold two or more optical disks.

In a second aspect of the invention, an optical disk drive comprises two optical disks which transmit laser beams, disposed at upper and lower positions, a first laser beam irradiation mechanism disposed on the upper surface side of the optical disk at the upper position, and used for recording or reproducing information on the lower surface of the optical disk at the lower position, a first evanescent optical system configured to receive the first laser beam irradiated from the first laser beam irradiation mechanism and pass through the two optical disks, and configured to radiate the first evanescent beam to the lower surface of the optical disk at the lower position, a second laser beam irradiation mechanism disposed on the lower surface side of the optical disk at the lower position, and used for recording or reproducing information on the upper surface of the optical disk held at the lower position, a second evanescent optical system configured to receive the second laser beam irradiated from the second laser beam irradiation mechanism, passing through the optical disk at the lower position, and configured to radiate the second evanescent beam to the upper surface of the optical disk held at the lower position, a third laser beam irradiation mechanism disposed on the upper surface side of the optical disk at the upper position, and used for recording or reproducing information on the lower surface of the optical disk at the upper position, a third evanescent optical system configured to receive the third laser beam irradiated from the third laser beam irradiation mechanism, passing through the optical disk at the upper position, and configured to radiate the third evanescent beam to the lower surface of the optical disk at the upper position, a fourth laser beam irradiation mechanism disposed on the lower surface side of the optical disk at the lower position, and used for recording or reproducing information on the upper surface of the optical disk at the upper position, and a fourth evanescent optical system configured to receive the fourth laser beam irradiated from the fourth laser beam irradiation mechanism, passing through the two optical disks, and configured to radiate the fourth evanescent beams to the upper surface of the optical disk at the upper position.

Embodiments of this aspect of the present invention may have any of the following features:

(1) The first to fourth evanescent optical systems may include first to fourth solid immersion lenses.

(2) The first to fourth solid immersion lenses may include a lens bottom surface to which the first to fourth laser beams incident and which radiates the first to fourth evanescent waves, and reflecting surfaces for reflecting the first to fourth laser beams incident from the lens bottom surfaces and converging them on the lens bottom surfaces.

In the present invention, the two optical elements, i.e., the parallel beam irradiation mechanism and the evanescent optical system, can be separated from each other so as to interpose the optical disk not having an optical reflecting layer between them. Therefore, the present invention can improve freedom of disposition of these optical elements and will be able to restrict the thickness of the optical disk drive. Particularly when both surfaces of the optical disk are used for the recording surface or when a plurality of optical disks are used simultaneously the present invention provides a remarkable effect for restricting the thickness of the optical disk drive.

The specific nature of the invention, as well as other objects, uses and advantages thereof, will clearly appear from the following description and from the following drawings in which like numerals refer to like parts.

DESCRIPTION OF THE PREFERRED EMBODIMENTS

Embodiments of the present invention are explained hereinafter with reference to the accompanying drawings.

Figure 1:
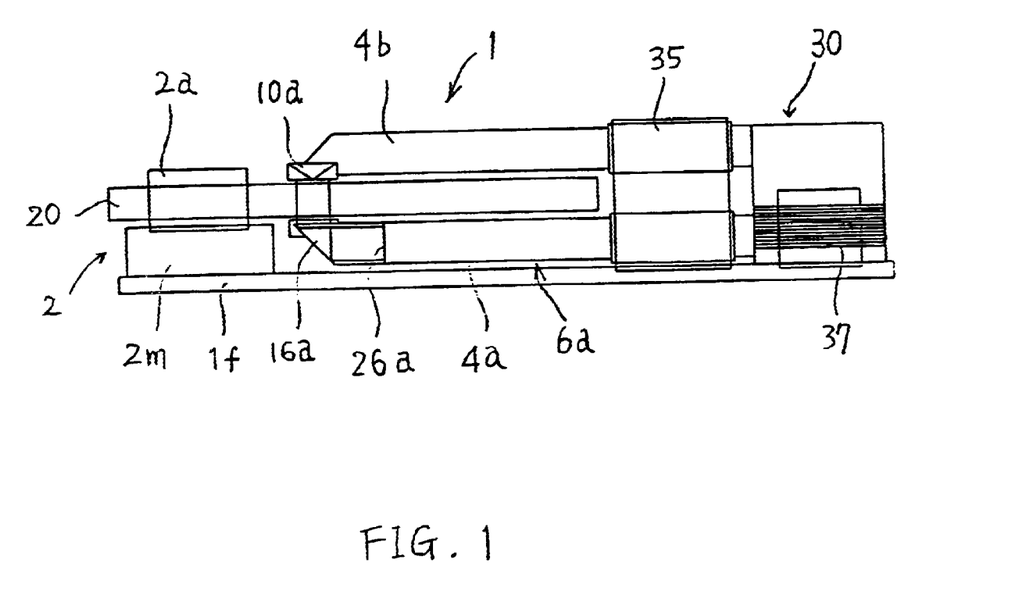
FIG. 1 is a schematic side view showing an optical disk drive according to the first embodiment of the present invention.
Figure 2:
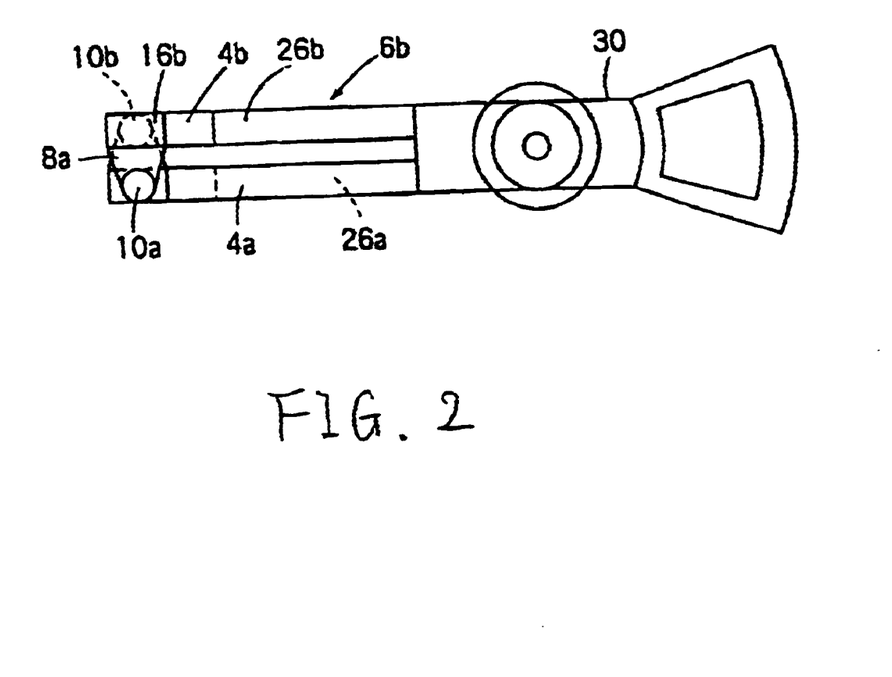
FIG. 2 is a schematic plan view showing the optical disk drive according to the first embodiment of the present invention.
Figure 3:
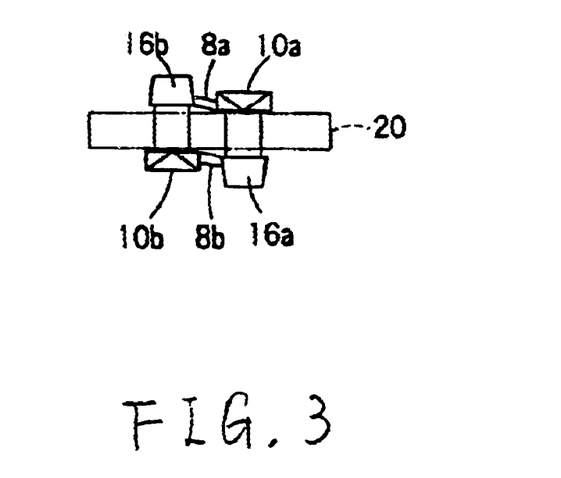
FIG. 3 is a schematic front view showing the optical disk drive according to the first embodiment of the present invention.

FIG. 1 is a schematic side view showing an optical disk drive according to the first embodiment of the present invention. FIG. 2 is a schematic plan view of the optical disk drive shown in FIG. 1. FIG. 3 is a schematic front view of the optical disk drive shown in FIG. 1.

The optical disk drive 1 according to the first embodiment of the present invention includes, as shown in FIG. 1 through FIG. 3, an optical disk 20 that does not have an optical reflecting layer (or in other words, transmits a laser beam) and an optical disk holding mechanism 2 for rotatably holding the optical disk 20. The optical disk holding mechanism 2 includes a support portion 2a for supporting the optical disk 20 and a spindle motor 2m for rotating the support portion 2a. The spindle motor 2m is fixed to a frame portion if of the main body 30.

A first parallel beam irradiation mechanism (laser beam irradiation mechanism) 6a for allowing parallel laser beams (laser beams) to be incident vertically on the surface of the optical disk 20 is disposed on one side (for example, the lower surface) of the optical disk 20 as depicted in FIG. 1.

It will be assumed hereby that the track pitch of the signal train recorded to the optical disk 20 is smaller than the wavelength of the parallel laser beam the first parallel beam irradiation mechanism 6a irradiates. It may be assumed also that both surfaces of the optical disk 20 may be utilized as the recording surface in this embodiment.

A first evanescent optical system 10a is provided on the other side of the optical disk 20 (for example here, the upper surface). This first evanescent optical system 10a receives the parallel laser beams that are incident from the first parallel beam irradiation mechanism 6a and pass through the optical disk 20, and emits the evanescent waves to the upper surface of the optical disk 20.

The first parallel beam irradiation mechanism 6a of this embodiment includes a first beam source portion 26a and a first rise-up mirror 16a disposed at a position opposing the first evanescent optical system 10a, for changing the direction of the parallel laser beams from the first beam source portion 26a. The first rise-up mirror 16a may comprise a so-called "45° mirror".

Figure 4:
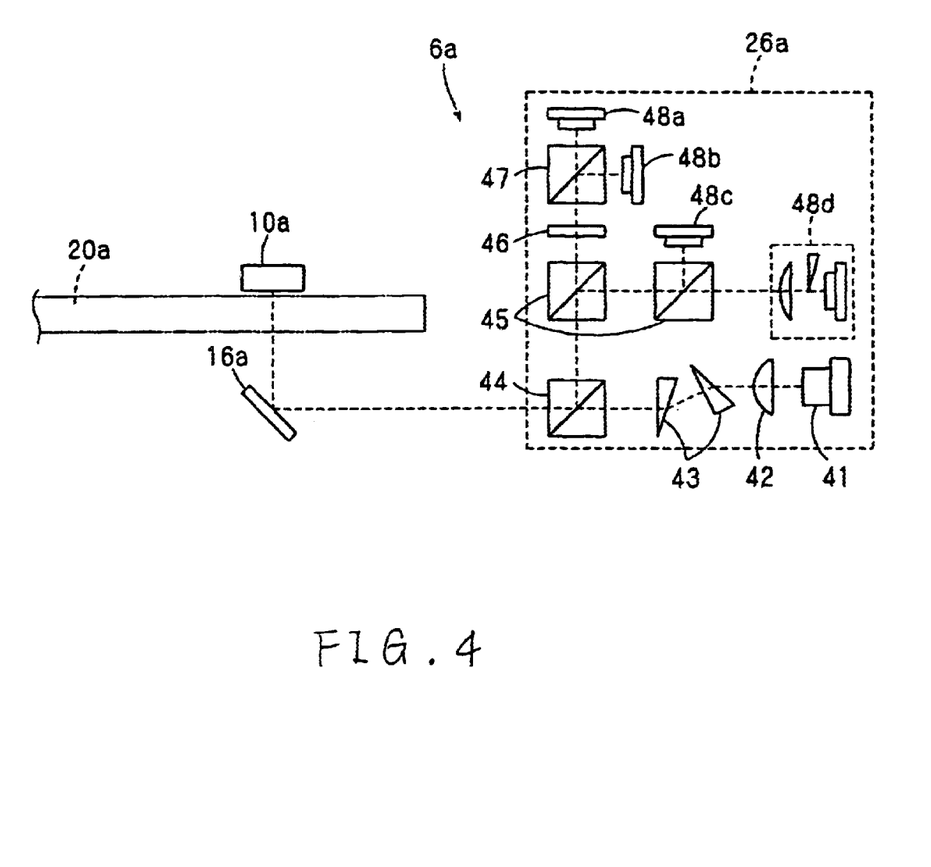
FIG. 4 is a schematic view showing an optical system of the optical disk drive according to the first embodiment of the present invention.

As shown in FIG. 4, the first beam source portion 26a may comprise a laser beam source 41, a collimater lens 42, a prism 43 and a beam splitter 44. Optical signal detectors 48a to 48d are disposed in an optical path branching from the beam splitter 44 through another beam splitter 45, a ½ wavelength plate 46 and a polarizing beam splitter 47.

This embodiment assumes that both surfaces of the optical disk 20 can be utilized as the recording surface, as previously described. Therefore, a second parallel beam irradiation mechanism 6b for allowing the laser beam to be incident vertically may be disposed on the other side (for example here, the upper surface side) of the optical disk 20, adjacent to the first evanescent optical system 10a, as shown in FIGS. 2 and 3.

A second evanescent optical system lob may be disposed on one of the surface sides (for example here, the lower surface side) of the optical disk 20 adjacent to the first parallel beam irradiation mechanism 6a. This second evanescent optical system lob receives the parallel laser beams that are incident from the second parallel beam irradiation mechanism 6b and pass through the optical disk 20, and emits the evanescent waves to the lower surface of the optical disk 20.

The second parallel beam irradiation mechanism 6b of this embodiment includes a second beam source portion 26b and a second rise-up mirror 16b disposed at a position opposing the second evanescent optical system lob for changing the direction of the parallel laser beam from the second beam source portion 26b, in the same way as the first parallel beam irradiation mechanism 6a. The second beam source portion 26b has the same construction as that of the first optical source portion 26a shown in FIG. 4. The second rise-up mirror 16b, too, may comprise the so-called "45° mirror".

As shown in FIGS. 1 and 2, the first and second beam source portions 26a and 26b are provided in swing arms 4a and 4b, respectively, which extend in a disk radial direction. A beam outgoing surface is disposed at the distal end portion of each swing arms 4a and 4b, and a proximal end portion of each of them is supported by the support main body portion 30.

The support main body portion 30 is rotatably put on the device main body frame portion if through a bearing 35. The support main body portion 30 has a driving coil 37 that drives rotary movement round the bearing 35. In this case, the beam source portions 26a and 26b may be provided in a fixed fashion in the device main body frame portion if instead of the swing arms 4a and 4b.

On the other hand, distal end portions of the swing arms 4a and 4b that extend in the arm shape in parallel with each other in different levels support the first and second rise-up mirrors 16a and 16b, respectively. The support main body portion 30 supports the proximal end portion of each swing arm 4a, 4b.

In FIG. 3 and FIG. 4 suspension arms 8a and 8b protrude in a direction crossing the swing arms 4a and 4b and are connected to the distal end portions of the swing arms 4a and 4b, respectively. These suspension arms 8a and 8b support the evanescent optical system 10a and the second evanescent optical system 10b, respectively.

Each evanescent optical system 10a, 10b has its surface for receiving the parallel laser beams and the surface for irradiating the evanescent waves that are positioned on the same side. Structural examples are shown in FIGS. 5 to 7.

Figure 5:
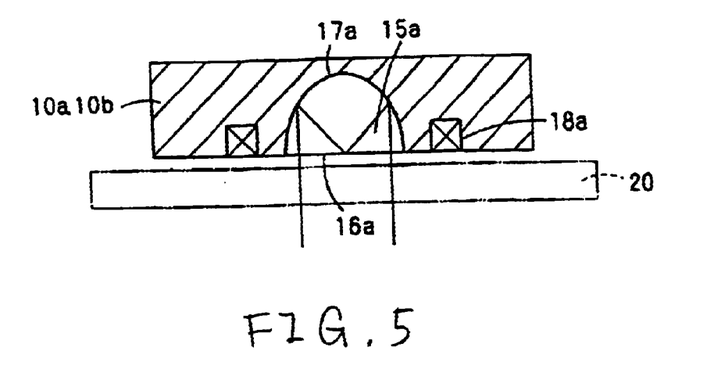
FIG. 5 is a schematic structural view showing an example of an evanescent optical system in the optical disk drive according to the first embodiment of the present invention.
Figure 6:
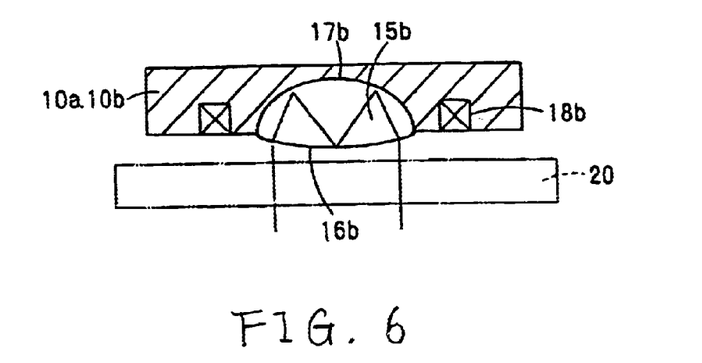
FIG. 6 is a schematic structural view showing another example of the evanescent optical system in the optical disk drive according to the first embodiment of the present invention.
Figure 7:
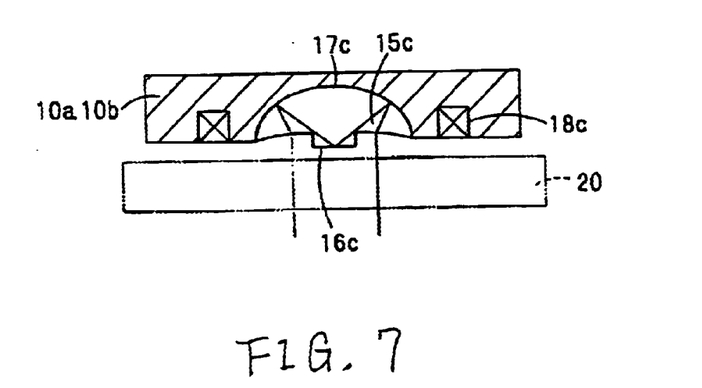
FIG. 7 is a schematic structural view showing still another example of the evanescent optical system in the optical disk drive according to the first embodiment of the present invention.

Each evanescent optical system 10a, 10b shown in FIGS. 5 to 7 has solid immersion lens 15a, 15b and 15c. Each of these immersion lenses 15a to 15c has a flat bottom surface 16a, a convex bottom surface 16b, a concave bottom surface 16c and an upper surface side reflecting surface (to be described later) 17a to 17c that is shaped into an appropriate shape.

The parallel laser beams incident from the bottom surface (16a to 16c) side pass through the lens 15a to 15c, and are reflected by the upper surface side reflecting surface 17a to 17c, are converged to the lens bottom surface 16a to 16c and generate the evanescent waves on the lens bottom surface 16a to 16c. The evanescent waves are irradiated from the lens bottom surfaces 16a to 16c on the disk 20.

In other words, each reflecting surface 17a to 17c on the upper surface side is shaped into a shape so that the parallel laser beams emanated from the lens bottom surface 16a to 16c and reflected by the reflecting surface 17a to 17c can form the image on the lens bottom surface 16a to 16c.

Each lens bottom surface 16a to 16c is positioned in such a manner that the distance relative to the optical disk 20 falls within the attenuation distance of the evanescent beam.

When a magneto-optic disk is used for the optical disk, a magnetic coil 18a to 18c may be disposed in the proximity of the solid immersion lens 15a to 15c to generate a required magnetic field as shown in FIGS. 5 to 7.

Next, the mode of operation of this embodiment having the construction described above will be explained.

The optical disk 20 not having the optical reflecting layer maybe fitted to the support portion 2a of the optical disk holding mechanism 2 as shown in FIGS. 1 to 3.

When the optical disk 20 is fitted and removed (when possible), the evanescent optical system 10a, 10b and the parallel beam irradiation mechanism 6a, 6b move back from the periphery of the optical disk holding mechanism 2 according to the rotation of the support main body portion 30. As a result, the optical disk 20 can be fitted and removed easily.

The optical disk 20 fitted to the support portion 2a may be rotated by the operation of the spindle motor 2m. On the other hand, the rotation of the support main body portion 30 positions the first evanescent optical system 10a with the second rise-up mirror 16b and the second evanescent optical system 10b with the first rise-up mirror 16a to the desired positions in such a manner as to interpose the optical disk 20 between them (refer to FIG. 3).

The first beam source portion 26a of the first parallel beam irradiation mechanism 6a irradiates the parallel laser beams from the beam outgoing surface. The first rise-up mirror 16a changes the direction of the parallel laser beams to the orthogonal direction, and the parallel beams are incident vertically on the lower surface of the optical disk 20.

The track pitch of the signal train recorded to the optical disk 20 is smaller than the wavelength of the parallel laser beams as previously described. Therefore, the parallel laser beams are restricted from being diffracted by the tracks of the optical disk 20. For, only the beams of the 0-order are allowed to pass because the angle of refraction of the ±1-order light exceeds 90°.

The parallel laser beams incident on the lower surface of the optical disk 20 pass through the optical disk 20 and are then incident into the first evanescent optical system 10a. The first evanescent optical system 10a irradiates the evanescent waves to the upper surface of the optical disk 20 by means of the laser beams it receives.

Explanation will be given in further detail. The parallel laser beams incident from the lens bottom surface 16a to 16c of the solid immersion lens 15a to 15c (refer to FIGS. 5 to 7) pass through the lens 15a to 15c, are reflected by the reflecting surface 17a to 17c on the upper surface side, are converged to the lens bottom surface 16a to 16c, and generate the evanescent waves on the lens bottom surface 16a to 16c. The evanescent waves are irradiated from the lens bottom surface 16a to 16c.

The information may be recorded or reproduced to or from the information recording track on the upper surface of the optical disk 20 as the evanescent waves irradiated to the upper surface of the optical disk 20 are utilized.

On the other hand, the second beam source portion 26b of the second parallel beam irradiation mechanism 6b irradiates the parallel laser beams from the beam outgoing surface. The second rise-up mirror 16b changes the direction of the parallel laser beams to a right angle, and the parallel laser beams are vertically incident on the upper surface of the optical disk 20.

In this case, too, possible diffraction of the parallel laser beams by the tracks of the optical disk 20 can be avoided. For, only the beams of the 0-order pass since the angle of refraction of the ±1-order exceeds 90°.

The parallel laser beams incident on the upper surface side of the optical disk 20 pass through the optical disk 20 and are incident into the second evanescent optical system lob. The second evanescent optical system lob irradiates the evanescent waves to the lower surface of the optical disk 20 by means of the laser beams it receives.

The information may be recorded or reproduced to or from the information recording tracks on the lower surface of the optical disk 20 as the evanescent waves irradiated to the lower surface of the optical disk 20 are utilized.

As described above, this embodiment disposes separately the first parallel beam irradiation mechanism 6a together with the second evanescent optical system 10b from the second parallel beam irradiation mechanism 6b with the first evanescent optical system 10a in such a fashion as to interpose the optical disk 20 not having the optical reflecting layer inside. Therefore, this embodiment can remarkably reduce the thickness of the optical disk drive 1. For, the thickness of the optical disk drive 1 required on one of the sides of the optical disk 20 is the thickness of either of the parallel beam irradiation mechanism 6a, 6b and the evanescent optical system 10a, 10b that has a greater thickness (generally, the parallel beam irradiation mechanism 6a, 6b).

In this embodiment, the tracking pitch of the signal train recorded to the optical disk 20 is smaller than the wavelength of the parallel laser beams. Therefore, this embodiment can avoid possible diffraction of the parallel laser beams by the tracks of the optical disk 20.

Each parallel beam irradiation mechanism 6a, 6b of this embodiment includes a rise-up mirror 16a, 16b disposed at the position opposing the evanescent optical system 10a, 10b. Therefore, this arrangement makes it easy to constitute and arrange the optical system.

Next, an optical disk drive according to the second embodiment of the present invention will be explained with reference to FIG. 8. This drawing is a schematic side view of the optical disk drive according to the second embodiment.

The optical disk drive according to the second embodiment uses a rise-up mirror 36 comprising a prism in place of the rise-up mirror having the 45° mirror as shown in FIG. 1.

The rest of the constructions are substantially the same as those of the optical disk drive 1 of the first embodiment shown in FIGS. 1 to 6. In the second embodiment, like reference numerals are used to identify like constituent portions of the first embodiment shown in FIGS. 1 to 6, and the explanation in detail of such portions is omitted.

In this embodiment, the rise-up mirror 36 comprising the prism may be constituted into a smaller thickness than the rise-up mirror comprising the 45° mirror. Therefore, this embodiment can further reduce the overall thickness of the optical disk drive.

An optical disk drive according to the third embodiment of the present invention will be explained with reference to FIG. 9. The drawing is a schematic front view of the optical disk drive according to the third embodiment.

Figure 9:
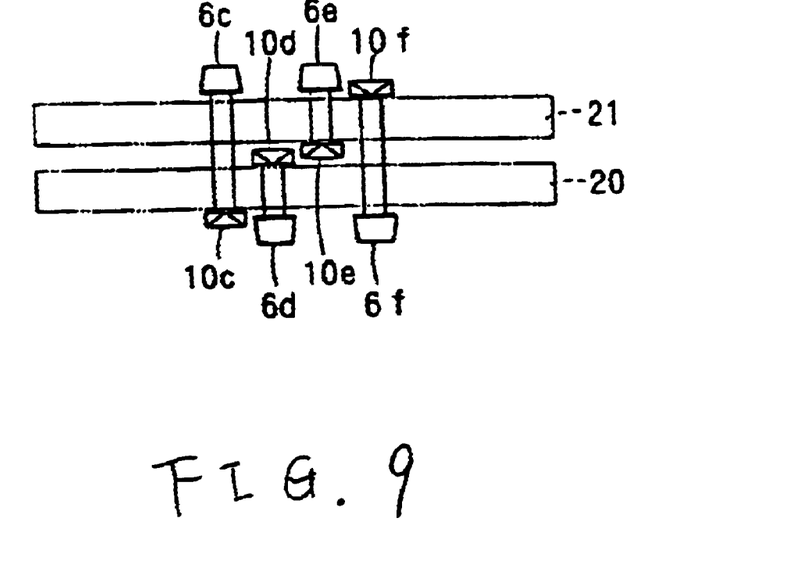
FIG. 9 is a schematic front view showing an optical disk drive according to the third embodiment of the present invention.

In the optical disk drive shown in FIG. 9, the optical disk holding mechanism 2 (not shown in FIG. 9) can hold two optical disks 20 and 21 in parallel with one another, and includes four parallel beam irradiation mechanism 6c to 6f and four evanescent optical systems 10c to 10f for forming pairs with the parallel irradiation mechanisms 6c to 6f, respectively, so that information may be recorded or reproduced to or from the four disk surfaces.

As shown in FIG. 9, each of the four evanescent optical systems 10c to 10f may be disposed in such a fashion that the bottom surface of its solid immersion lens faces the corresponding one of the four recording surfaces and is positioned within the attenuation distance of evanescence from each disk surface.

As shown also in FIG. 9, the first parallel beam irradiation mechanism 6c used for recording or reproducing the information, on the lower surface of the optical disk 20 held at the lower position, may be disposed on the upper surface side of the optical disk 21 held at the upper position. The parallel laser beams irradiated from the first parallel beam irradiation mechanism 6c pass through the two optical disks 20 and 21 and are incident on the first evanescent optical system 10c for irradiating the evanescent beams on the lower surface of the optical disk 20.

On the other hand, the second parallel beam irradiation mechanism 6d used for recording or reproducing the information to or from the upper surface of the optical disk 20 held at the lower position may be disposed on the lower surface side of the optical disk 20 held at the lower position. The parallel laser beams irradiated from the second parallel beam irradiation mechanism 6d pass through the optical disk 20 and are incident on the second evanescent optical system 10d for irradiating the evanescent beams to the upper surface of the optical disk 20.

Next, the third parallel beam irradiation mechanism 6e used for recording or reproducing the information to or from the lower surface of the optical disk 21 held on the upper side may be disposed on the upper surface side of the optical disk 21 held at the upper position. The parallel beams irradiated from the third parallel beam irradiation mechanism 6e pass through the optical disk 21 and are incident into the third evanescent optical system 10e for irradiating the evanescent beams to the lower surface of the optical disk 21.

The fourth parallel beam irradiation mechanism 6f used for recording or reproducing the information to or from the upper surface of the optical disk 21 held on the upper side may be disposed on the lower surface side of the optical disk 20 held on the lower side. The parallel laser beams irradiated from the fourth parallel beam irradiation mechanism 6f pass through the two optical disks 20 and 21 and are incident on the fourth evanescent optical system 10f for emitting the evanescent beams to the upper surface of the optical disk 21.

Figure 8:
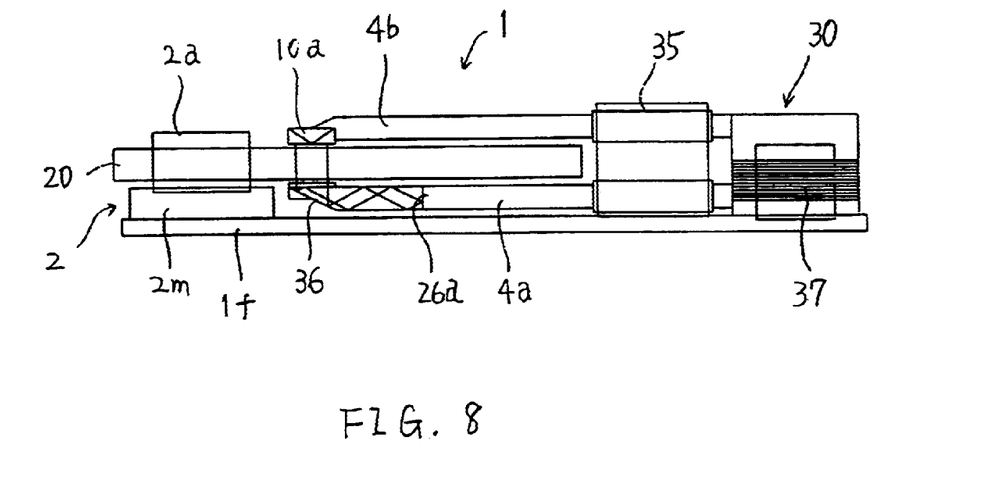
FIG. 8 is a schematic side view showing an optical disk drive according to the second embodiment of the present invention.

The rest of the constructions are substantially the same as those of the optical disk drive 1 according to the second embodiment shown in FIG. 8. In this embodiment, like reference numerals are used to identify like constituent portions as those of the second embodiment shown in FIG. 8, and the explanation in detail of such portions is omitted.

According to this embodiment, all the parallel beam irradiation mechanisms 6c to 6f may be disposed in bulk on the upper and lower sides of the optical disks 20 and 21 as a whole. Therefore, the gap between the optical disks 20 and 21 can be set to a small value and eventually, the overall thickness of the optical disk drive can be remarkably reduced.

Next, the optical disk drive according to a fourth embodiment will be explained with reference to FIG. 10.

Figure 10:
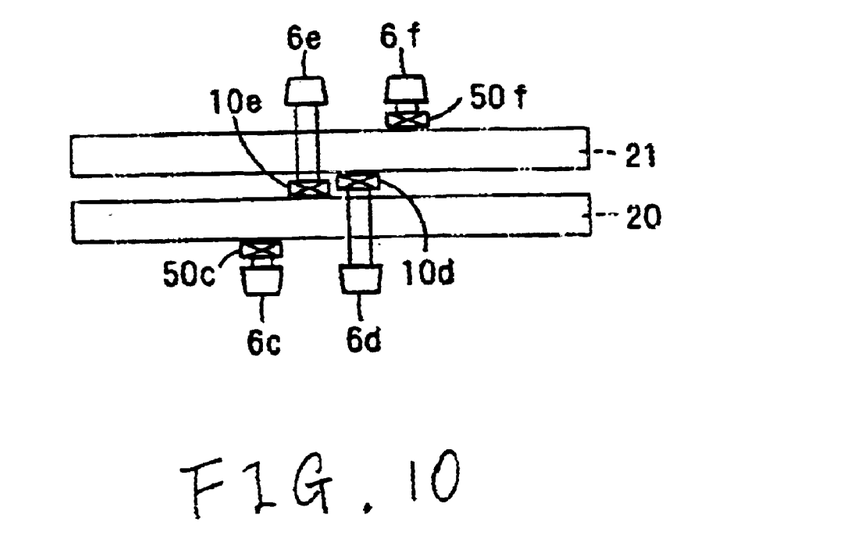
FIG. 10 is a schematic front view showing an optical disk drive according to the fourth embodiment of the present invention.

FIG. 10 is a schematic front view of the optical disk drive according to the fourth embodiment.

As shown in FIG. 10, the first parallel beam irradiation mechanism 6c used for recording or reproducing information to or from the lower surface of the optical disk 20 held on the lower side maybe disposed on the lower surface side of the optical disk 20 held on the lower side. A conventional-type first evanescent optical system 50c for emitting the evanescent beams to the lower surface of the optical disk 20 by means of the parallel laser beams irradiated from the first parallel beam irradiation mechanism 6c may be interposed between the first parallel beam irradiation mechanism 6c and the optical disk 20 held on the lower side.

The fourth parallel beam irradiation mechanism 6f used for recording or reproducing the information to or from the upper surface of the optical disk 21 held on the upper side may be disposed above the optical disk 21 held on the upper side. A conventional-type fourth evanescent optical system 50f for irradiating the evanescent beams to the upper surface of the optical disk 21 by means of the parallel laser beams irradiated from the fourth parallel beam irradiation mechanism 6c may be interposed between the fourth parallel beam irradiation mechanism 6f and the optical disk 21 held on the upper side.

The rest of the constructions are substantially the same as those of the optical disk drive according to the third embodiment that is shown in FIG. 9. In the fourth embodiment, like reference numerals are used to identify like portions of the third embodiment shown in FIG. 9, and the explanation in detail is omitted.

In this embodiment, too, all the parallel beam irradiation mechanisms 6c to 6f may be disposed in bulk on the upper and lower sides of the optical disks 20 and 21 as a whole. Therefore, the overall thickness of the optical disk drive 1 can be reduced, though not to the extent of the optical disk drive according to the third embodiment.

As explained above in detail, the present invention may separately arrange the parallel beam irradiation mechanism and the evanescent optical system while interposing the optical disk not having the optical reflecting layer inside. Therefore, freedom of disposition of these optical elements can be improved, and the thickness of the optical disk drive can be restricted.

Particularly, when both surfaces of an optical disk are used as a recording surface or when a plurality of optical disks are used simultaneously as the operation object, the thickness of the optical disk drive may be remarkably restricted by the present invention.

What is claimed is:

1. An optical disk drive comprising:

two optical disks which transmits laser beams, disposed at upper and lower positions;

a first laser beam irradiation mechanism disposed on the upper surface side of the optical disk at the upper position, and used for recording or reproducing information on the lower surface of the optical disk at the lower position;

a first evanescent optical system configured to receive the first laser beam irradiated from the first laser beam irradiation mechanism, passing through the two optical disks, and configured to irradiate the evanescent beam to the lower surface of the optical disk at the lower position;

a second laser beam irradiation mechanism disposed on the lower surface side of the optical disk at the lower position, and used for recording or reproducing information on the upper surface of the optical disk held at the lower position;

a second evanescent optical system configured to receive the second laser beam irradiated from the second laser beam irradiation mechanism, passing through the optical disk at the lower position, and configured to radiate the second evanescent beam to the upper surface of the optical disk held at the lower position;

a third laser beam irradiation mechanism disposed on the upper surface side of the optical disk at the upper position, and used for recording or reproducing information on the lower surface of the optical disk at the upper position;

a third evanescent optical system configured to receive the third laser beam irradiated from the third laser beam irradiation mechanism, passing through the optical disk at the upper position, and configured to radiate the third evanescent beam to the lower surface of the optical disk at the upper position;

a fourth laser beam irradiation mechanism disposed on the lower surface side of the optical disk at the lower position, and used for recording or reproducing information on the upper surface of the optical disk at the upper position; and a fourth evanescent optical system configured to receive the fourth laser beam irradiated from the fourth laser beam irradiation mechanism, passing through the two optical disks, and configured to irradiate the fourth evanescent beams to the upper surface of the optical disk at the upper position.

2. An optical disk drive according to claim 1, wherein the first to fourth evanescent optical systems include first to fourth solid immersion lenses.

3. An optical disk drive according to claim 2, wherein the first to fourth solid immersion lenses include a lens bottom surfaces to which the first to fourth laser beams incident and which radiates the first to fourth evanescent waves, and reflecting surfaces for reflecting the first to fourth laser beams incident from the lens bottom surfaces and converging them on the lens bottom surfaces.

4. An optical disk drive, comprising:

an optical disk which permits transmission of a laser beam and includes at least one recording surface;

an optical disk holding mechanism configured to rotatably support the optical disk;

a first laser beam irradiation mechanism disposed on one side of the optical disk, configured to cause a first laser beam to be incident vertically on one surface of the optical disk; and a first evanescent optical system disposed on a side of the optical disk opposite the first laser beam irradiation mechanism, configured to receive the first laser beam which emanates from the first laser beam irradiation mechanism and passes through the optical disk, and to radiate a first evanescent wave on the other surface of the optical disk which is the at least one recording surface, wherein the first evanescent optical system includes a first solid immersion lens.

5. An optical disk drive according to claim 4, wherein the first solid immersion lens includes a lens bottom surface to which the first laser beam is incident and which radiates the first evanescent wave, and a reflecting surface which reflects the first laser beam incident from the lens bottom surface and converges the first laser beam to the lens bottom surface.

6. An optical disk drive according to claim 5, wherein the distance between the lens bottom surface of the first solid immersion leans and the surface of the optical disk opposing the lens bottom surface is within the attenuation distance of the first evanescent wave.

7. An optical disk drive, comprising:

an optical disk which permits transmission of a laser beam and includes at least one recording surface;

an optical disk holding mechanism configured to rotatably support the optical disk;

a first laser beam irradiation mechanism disposed on one side of the optical disk, configured to cause a first laser beam to be incident vertically on one surface of the optical disk;

a first evanescent optical system disposed on a side of the optical disk opposite the first laser beam irradiation mechanism, configured to receive the first laser beam which emanates from the first laser beam irradiation mechanism and passes through the optical disk, and to radiate a first evanescent wave on the other surface of the optical disk which is the at least one recording surface;

a second laser beam irradiation mechanism disposed adjacent to the first evanescent optical system, configured to cause a second laser beam to be vertically incident on the other surface of the optical disk; and a second evanescent optical system disposed adjacent to the first laser beam irradiation mechanism, configured to receive the second laser beam which emanates from the second laser beam irradiation mechanism and passes through the optical disk, and to radiate a second evanescent wave on the surface of the optical disk which is a recording surface.

8. An optical disk drive according to claim 7, wherein a track pitch of the signal train recorded to the optical disk is smaller than the wavelength of the second laser beam.

9. An optical disk drive according to claim 7, wherein the second laser beam irradiation mechanism includes a second mirror disposed at a position opposing the second evanescent optical system.

10. An optical disk drive according to claim 9, wherein the second mirror is a 45° mirror.

11. An optical disk drive according to claim 9, wherein the second mirror is a prism.

12. An optical disk drive according to claim 7, wherein the second evanescent optical system includes a second solid immersion lens.

13. An optical disk drive according to claim 12, wherein the second solid immersion lens includes a lens bottom surface to which the second laser beam is incident and which radiates the second evanescent waves, and a reflecting surface for reflecting the second laser beam incident from the lens bottom and converging the second laser beam to the lens bottom surface.

14. An optical disk drive according to claim 13, wherein the distance between the lens bottom surface of the second solid immersion lens and the surface of the optical disk opposing the lens bottom surface is within the attenuation distance of the evanescent wave.

* * * * *